United States Patent [19]

Schwarz

[11] 4,417,003

[45] * Nov. 22, 1983

[54] FOAMABLE POLYMERIC STYRENE PARTICLES

[75] Inventor: Richard A. Schwarz, Big Spring, Tex.

[73] Assignee: Cosden Technology, Inc., Dallas, Tex.

[*] Notice: The portion of the term of this patent subsequent to Jun. 14, 2000 has been disclaimed.

[21] Appl. No.: 483,407

[22] Filed: Apr. 8, 1983

Related U.S. Application Data

[63] Continuation-in-part of Ser. No. 423,487, Sep. 24, 1982, Pat. No. 4,388,418.

[51] Int. Cl.$^3$ .................................................. C08J 9/20
[52] U.S. Cl. ........................................ 521/56; 521/88; 521/98; 521/907; 524/373; 524/467
[58] Field of Search ................... 524/373, 467; 521/88, 521/98, 56, 907

[56] References Cited

U.S. PATENT DOCUMENTS

| | | | |
|---|---|---|---|
| 3,004,935 | 10/1961 | Roley, Jr. et al. | 521/907 |
| 3,058,926 | 10/1962 | Eichhorn | 521/907 |
| 3,058,929 | 10/1962 | Vanderhoff et al. | 521/907 |
| 3,188,295 | 6/1965 | Ballast et al. | 521/907 |
| 3,639,302 | 2/1972 | Brown et al. | 524/373 |

*Primary Examiner*—Morton Foelak
*Attorney, Agent, or Firm*—Russell H. Schlattman; M. Norwood Cheairs; Michael J. Caddell

[57] ABSTRACT

An expandable polymeric styrene particle is provided from which molded foamed articles can be produced exhibiting reduced flammability characteristics. The expandable polymeric styrene particle contains a blowing agent, a minor amount of bis(allyl ether) of tetrabromobisphenol A and a minor amount of dibromoethyldibromocyclohexane. The additives can be incorporated during impregnation with the blowing agent or by blending with the expandable particles after impregnation.

6 Claims, No Drawings

FOAMABLE POLYMERIC STYRENE PARTICLES

This application is a continuation-in-part of my co-pending application Ser. No. 423,487 filed Sept. 24, 1982, now U.S. Pat. No 4,388,418.

TECHNICAL FIELD

This invention relates to foamable polymeric styrene particles, such as foamable polystyrene particles. More particularly, this invention relates to such foamable particles having increased utility in the manufacture of foamed articles in that such foamed articles exhibit reduced flammability characteristics.

BACKGROUND OF THE INVENTION

Foamable polymeric styrene particles and the articles produced from such particles are well known in the art. Such articles include insulated building panels, decorative display objects, novelties, cushioning materials, floatation devices, hot or cold beverage containers, portable ice or cooling chests or boxes, etc. The principal utilitarian characteristics of such foamed articles are their light weight and good heat insulation qualities.

The foamable polymeric particles are generally prepared by impregnating the particles with from 1% to 20% by weight of a suitable expanding or blowing agent such as pentane. In producing the foamed articles, the impregnated particles, or beads, are first subjected to a pre-expansion step wherein the beads are heated with steam in an unconfined space to produce a prepuff having a relatively low density. The prepuffed beads are then placed into the desired confined mold and final expansion accomplished with the further introduction of steam, followed by cooling and removal of the molded article.

A prerequisite for the use of foamed articles in certain applications is that such foamed articles must exhibit reduced flammability. This would be particularly true of foamed articles or panels employed in building construction. While the prior art discloses a number of additives that can be employed to reduce the flammability characteristics of foamed articles, there remains much room for further improvement.

SUMMARY OF THE INVENTION

It has now been found that finished foamed articles having reduced flammability characteristics are obtained from expandable polymeric styrene particles having incorporated therein a blowing agent, a minor amount of bis (allyl ether) of tetrabromobisphenol A and a minor amount of dibromoethyldibromocyclohexane. It has been found that in reducing the flammability characteristics of the finished foamed articles, the combination of the two stated additives exhibit a synergistic effect; the reduction in flammability characteristics using the combination of the two additives being greater than the theoretical expected additive effects of the two.

DESCRIPTION OF A PREFERRED EMBODIMENT

To a kettle equipped with an agitator was charged 100 parts by weight of water, 2 parts by weight of tricalcium phosphate, 0.05 parts by weight of sodium dodecylbenzene sulfonate, 100 parts by weight of polystyrene beads having a bead diameter of about 1 mm. and 8.0 parts by weight of n-pentane. In the examples which follow, the flammability reducing additives of this invention were also charged at this point in the amounts indicated.

The kettle was heated to a temperature of 215°–230° F. (102°–110° C.) and maintained within this temperature range for 7–10 hours with agitation. The kettle was then cooled to room temperature, the contents acidified with nitric acid, the beads separated from the aqueous medium, washed with water and air dried at room temperature.

For pre-expansion, the beads were placed in a kettle equipped with agitators and means for passing steam through the beads. Prepuffs were formed by passing steam at 5 psig (34 kPa) through the beads for approximately 2 minutes. The prepuff particles had a diameter of approximately 3/16 inch (5 mm.).

To test the qualities and characteristics of the finished molded foamed article, a test mold 6"×12"×6" (15 cm.×30 cm.×15 cm.) was employed. The mold was jacketed to permit steam injection into the contents of the mold. The mold was partially filled with prepuffs, closed and steam passed through the mold at 220° F. (104° C.) for approximately 10–20 seconds. The molded article was then allowed to cool until capable of removal from the mold.

Samples of molded foamed articles were prepared using the above procedure, with and without the incorporation of the flammability reducing additives of this invention. The following examples illustrate the comparative results obtained.

EXAMPLES

To measure the flammability characteristics of finished molded foam articles, using a hot wire a test strip was cut from the molded block prepared as described above. The test strip measured 9"×4"×½" (23 cm.×10 cm.×1.3 cm.). The test strip was suspended vertically, with its longest dimension in the vertical position. A gas flame approximately ½" (1.3 cm.) long was directed against the test strip approximately 1" (2.5 cm.) above its base. The gas flame was directed against the test strip until the material ignited, and the gas flame then removed. The vertical (heighth) and horizontal (width) of the burn area were measured and the combination of these two measurements used to establish a burn rating in accordance with Table 1; rating 1 being excellent and rating 4 failing.

TABLE 1

| Rating | Vertical Burn | Horizontal Burn |
|---|---|---|
| 1 | 0 to 10 cm. | 3 to 4 cm. |
| 2 | greater than 10 to 16 cm. | greater than 4 to 6 cm. |
| 3 | greater than 16 to 20 cm. | greater than 6 to 8 cm. |
| 4 | greater than 20 cm. | greater than 8 cm. |

The bis (allyl ether) of tetrabromobisphenol A employed was an off-white crystalline solid having a molecular weight of 623.9, bromine content of 51.2% by weight and a melting point of 110°–120° C. The dibromoethyldibromocyclohexane employed was a white crystalline powder having a molecular weight of 428, bromine content of 74% by weight and a melting point of 65°–80° C.

Table 2 sets forth the flammability characteristics of molded foamed polystyrene articles containing the flammability reducing additives of this invention compared with molded foamed polystyrene articles containing no additives. In each case the content of the additive is expressed as percent by weight of polystyrene.

TABLE 2

| Example | Additive | Test Burn Rating |
|---------|----------|------------------|
| 1 | None | 4 |
| 2 | 0.2% bis(allyl ether) of tetrabromobisphenol A | 4 |
| 3 | 1.0% dibromoethyldibromocyclohexane | 4 |
| 4 | 0.2% bis(allyl ether) of tetrabromobisphenol A and 1.0% dibromoethyldibromocyclohexane | 1.5-2 |
| 5 | 0.5% bis(allyl ether) of tetrabromobisphenol A and 0.6% dibromoethyldibromocyclohexane | 2.1 |

Comparing the results of Examples 2 and 3 with the results of Examples 4 and 5, clearly illustrates the synergistic effect of the flammability reducing additives of this invention.

The improved flammability characteristics of expandable polymeric styrene particles discussed herein are realized by incorporating only minor amounts of bis (allyl ether) of tetrabromobisphenol A and dibromoethyldibromocyclohexane into the polymeric styrene particles. Expandable polymeric styrene particles containing from about 0.1% to about 0.5% of bis (allyl ether) of tetrabromobisphenol A and from about 0.5% to about 2.5% of dibromoethyldibromocyclohexane both by weight of polymeric styrene, are particularly useful. In accordance with the preferred embodiment of this invention, the additives are preferably incorporated into the polymeric styrene particles during the incorporation of the blowing agent. However, advantageous results are also accomplished by external blending of the additives with expandable polymeric styrene particles after first incorporating the blowing agent. This can be carried out by tumbling dried expandable polymeric styrene particles with the desired quantity of the additives.

The invention has been described herein with particular regard to expandable polystyrene particles having incorporated therein a minor amount of the additives of this invention. In its applicability, the invention is not limited to polystyrene as other vinyl aromatic polymers can be employed. These include polymers derived from such vinyl aromatic monomers as vinyl toluene, isopropylstyrene, alpha-methylstyrene, chlorostyrene, tert.-butylstyrene as well as to copolymers of vinyl aromatic monomers and butadiene, alkyl acrylates, acrylonitrile, etc. As used in the specification and claims the expression "polymeric styrene particles" is meant to include particles of all such polymers and copolymers.

The invention has been described herein using pentane as the blowing agent. The invention is not limited to the use of pentane as other blowing agents can be employed. Suitable blowing agents include butane, isopentane, cyclopentane, hexane, heptane, cyclohexane and the lower boiling halogenated hydrocarbons. Mixtures of the various mentioned blowing agents can also be employed. Expandable polymeric styrene particles usually contain from 1 to 20% by weight of the blowing agent. Impregnation with the blowing agent to produce expandable polymeric styrene particles can be carried out over a wide temperature range, namely, at temperatures ranging from about 140° (60° C.) to about 302° F. (150° C.).

What is claimed is:

1. An expandable polymeric styrene particle having incorporated therein from about 0.1% to about 0.5% by weight of bis (allyl ether) of tetrabromobisphenol A and from about 0.5% to about 2.5% by weight of dibromoethyldibromocyclohexane, all percentages being based upon the weight of the polymeric styrene.

2. The particle of claim 1 wherein the polymeric styrene is polystyrene.

3. The particle of claim 2 wherein the blowing agent is pentane.

4. In a process for producing an expandable polymeric styrene particle wherein a polymeric styrene particle is impregnated with a blowing agent and the resultant expandable polymeric styrene particle recovered, the improvement which comprises impregnating the polymeric styrene particle with from about 0.1% to about 0.5% by weight of bis (allyl ether) of tetrabromobisphenol A and from about 0.5% to about 2.5% by weight of dibromoethyldibromocyclohexane, all percentages being based upon the weight of the polymeric styrene, during impregnation of said polymer with said blowing agent.

5. The process of claim 4 wherein the polymeric styrene is polystyrene.

6. The process of claim 5 wherein the blowing agent is pentane.

* * * * *